(12) United States Patent
Davis et al.

(10) Patent No.: US 6,302,835 B1
(45) Date of Patent: Oct. 16, 2001

(54) POLYSILOXANE BASED FUSER MEMBER CONTAINING ZIRCONIUM SILICATE AND A SILICON T-RESIN

(75) Inventors: Stephen V. Davis, Rochester; Nataly Boulatnikov, Ontario, both of NY (US)

(73) Assignee: NexPress Solutions LLC, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/452,357

(22) Filed: Dec. 1, 1999

(51) Int. Cl.$^7$ ................................................. G03G 15/20
(52) U.S. Cl. ........................... 492/59; 399/324; 399/325; 428/36.91; 428/328; 428/331; 428/447; 428/448; 428/450; 492/46; 492/53; 492/56; 524/443; 524/492; 524/493; 524/588; 524/730; 524/731

(58) Field of Search ................................. 399/324, 325; 428/447, 448, 450, 328, 36.9, 36.91, 35.8; 492/53, 56, 59; 524/443, 492, 493, 588, 730, 731

(56) References Cited

U.S. PATENT DOCUMENTS

| | | | |
|---|---|---|---|
| 2,658,882 | * 11/1953 | Maneri | 524/443 |
| 4,659,621 | 4/1987 | Finn et al. | 428/339 |
| 5,035,950 | 7/1991 | Del Rosario | 428/421 |
| 5,166,031 | 11/1992 | Badesha et al. | 430/124 |
| 5,474,821 | 12/1995 | Kass | 428/35.8 |
| 5,753,361 | 5/1998 | Visser | 428/323 |
| 5,960,245 | * 9/1999 | Chen et al. | 399/333 |

* cited by examiner

Primary Examiner—D. S. Nakarani

(57) ABSTRACT

A material for coating an imaging member comprising: a crosslinked poly(dialkylsiloxane), zirconium silicate and optional T-resin.

17 Claims, 2 Drawing Sheets

POLYSILOXANE BASED FUSER MEMBER CONTAINING ZIRCONIUM SILICATE AND A SILICON T-RESIN

FIELD OF THE INVENTION

The present invention relates to the field of fuser members and coatings therefor useful in imaging and copying.

BACKGROUND OF THE INVENTION

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that contacts the side of the receiver sheet carrying the unfixed or unfused toner is known as the fuser roller. The other roller is known as the pressure roller. The area of contact is known as the nip.

A toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as offset. Offset can also occur on the pressure roller.

Offset is undesirable because it can result in transfer of the toner to non-image areas of succeeding copies and can lead to more rapid contamination of all machine parts in contact with the fusing rollers and to increased machine maintenance requirements. It can also lead to receiver (e.g. paper) jams as the toner-roller adhesion causes the receiver sheet to follow the surface of the roller rather than being released to the post-nip paper path.

It is common in some machines to apply release oil externally to the roller in the machine as it is being used. The release oil is typically poly(dialkylsiloxane) (PDMS) oil. PDMS oil does an excellent job in its role as release agent; however, there are associated disadvantages.

The release agent's compatibility with PDMS-based roller materials result in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roller. This can cause problems when different size papers are used and can lead to increased wear and decreased roller life as described in U.S. Pat. No. 5,753,361. This wear can also lead to an uneven pressure distribution between the two rollers of the fusing assembly resulting in poor print quality as described in U.S. Pat. No. 5,035,950 and as is well known in the art. Another associated problem is the tendency of a silicone layer to soften as it swells with the polydimethylsiloxane release fluids and its subsequent debonding as described in U.S. Pat. No. 5,166,031. Here the suggested solution to the problems of the silicone fuser member coating was to develop fluoroelastomer analogs to replace the silicone. However, the toner's tendency to offset is sacrificed.

In applications using a donor roller oiling system, the use of a silicone based outer layer and its subsequent swell by the polydimethylsiloxane release fluid results in excessive swelling leading to failure of the roller to provide a uniform layer of release fluid as described in U.S. Pat. No. 4,659,621. Here the suggested solution to the problems of the silicone fuser member coating was to develop fluoroelastomer analogs to replace the silicone. However, the toner's tendency to offset is sacrificed.

There continues to be a need for improved fuser and pressure rollers with improved fusing performance, e.g., reduced impact of swell on wear resistance without reducing the toner releasability as well as improved mechanical properties and thermal conductivity.

SUMMARY OF THE INVENTION

The present invention provides an improved fuser member with improved mechanical properties, thermal conductivity, unimpaired release and improved wear resistance properties and including a reduction in oil swell and the effect of oil swell on wear.

In accordance with the present invention there is provided a fuser member having a core and an outer layer of material formed over the core, the outer layer including a composite material, comprising:

(a) an optional silicone T-resin;

(b) a crosslinked poly(dialkylsiloxane), wherein the poly (dialkylsiloxane) has a weight-average molecular weight before crosslinking of about 5,000 to 80,000;

(c) an optional aryl silane crosslinking agent; and (d) zirconium silicate.

An advantage of the present invention is that by reducing the oil swell of the fuser member wear resistance of the roller can be improved resulting in a longer useful life through reduction step.

Another advantage of the current invention is that it successfully reduces the oil swollen wear resulting in the advantages listed above without sacrificing any of the release characteristics thereby not requiring a greater quantity of release agent.

DETAILED DESCRIPTION OF THE INVENTION

Figure 1:
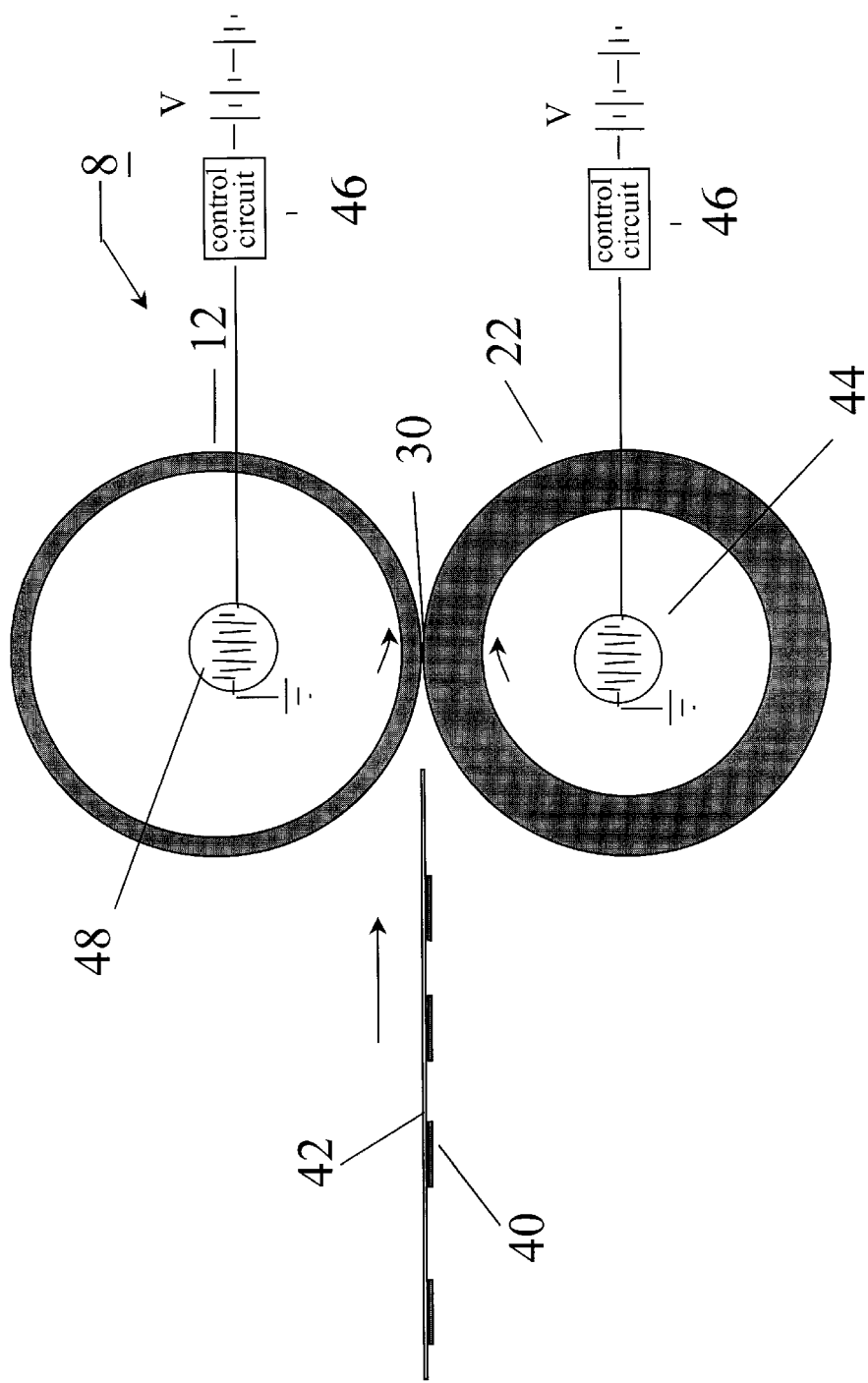
FIG. 1 is a cross-sectional view of a fusing assembly including a fuser roller and a pressure roller.

Turning first to FIG. 1, there is shown a fusing assembly 8 which includes a fusing member, shown as fusing roller 12 and another fusing member, shown as a pressure roller 22.

The fuser roller 12 is heated either internally with a heating lamp 48 controlled by circuit 46. The pressure roller 22 may or may not be likewise heated by either internally with a heating lamp 44 controlled by another circuit 46. In place of using an internal heating element the exterior surface of fuser roller 12 and pressure roller 22 can be heated. The fuser roller 12 and pressure roller 22 come together under pressure to form a nip 30. The receiver sheet 42 with unfused toner 40 pass through the nip to fuse the toner 40 to the receiver sheet 42.

Figure 2:
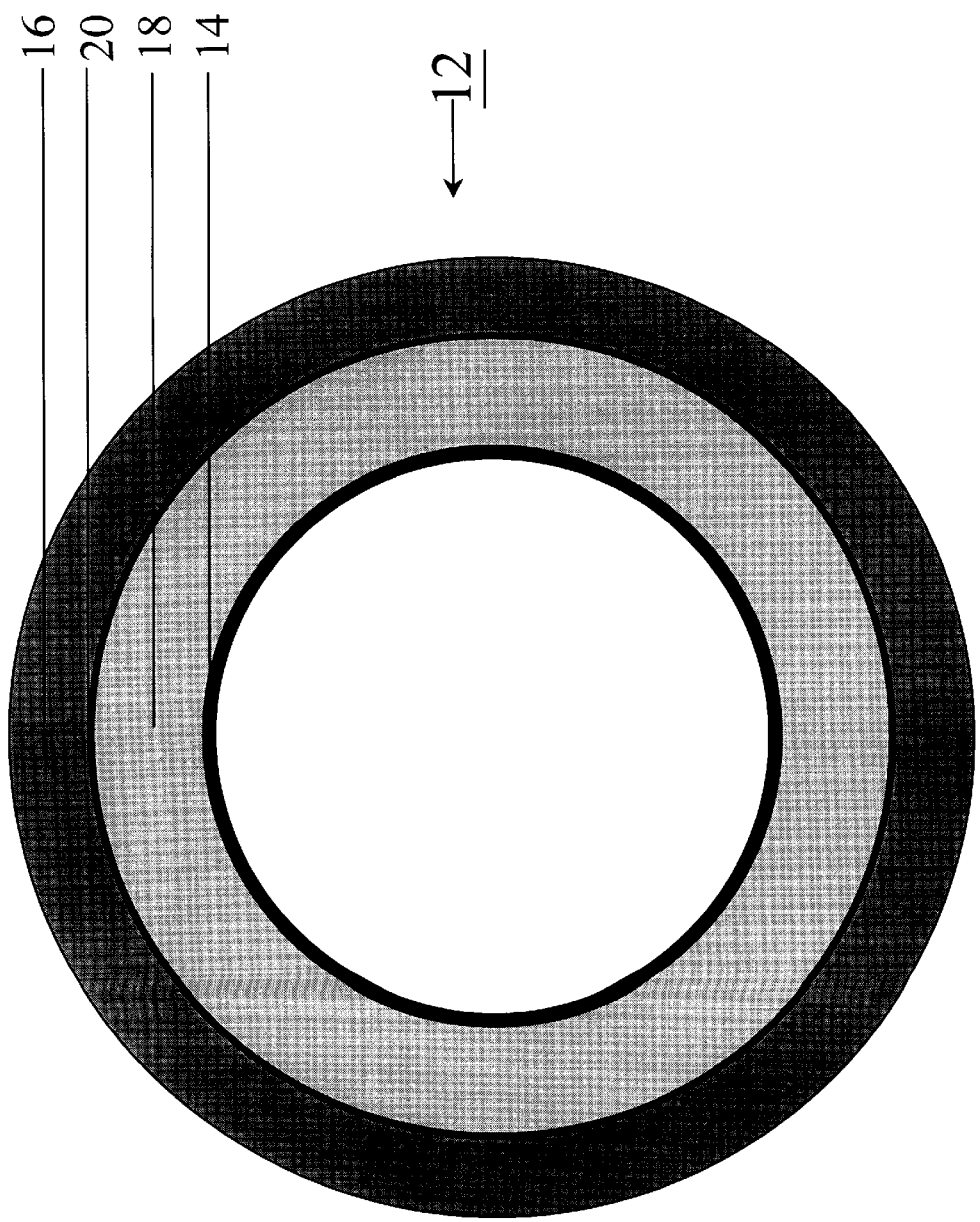
FIG. 2 is a cross-sectional view of the fusing member of FIG. 1.

In FIG. 2, there is shown a fusing member 10 which is in the form of a roller such as fuser roller 12. Also, the pressure roller 22 can have the same or similar configuration as shown in FIG. 2. The fusing roller 12 includes a metallic core 14 which is preferably formed of an aluminum shaft which is connected to a gudgeon (not shown) which has a thermal conductivity lower than the metallic core 14 disposed over the metallic core 14 is an outer layer 16. The outer layer 16 includes a silicone T-resin and other materials that will be discussed later. As shown it may be preferable to include intermediate layers between the metallic core 14 and the outer layer 16. In the embodiment shown there is an optional cushion layer 18 formed on the metallic core 14 and another optional intermediate barrier layer 20 formed between the outer layer 16 and the cushion layer 18.

In practice the cushion layer 18 and the intermediate layer 20 may be omitted. When present both layers would be formed of a temperature resistant material. In the case of the fuser member being a fusing roller (12 FIG. 1) it can be desirable for the cushion layer 18 to be thermally conductive such as a metal oxide filled silicone elastomer. In the case of the fuser member being a pressure roller (22 FIG. 1) it may be desirable for the cushion layer 18 to be of low thermally conductivity such a silicon oxide filled silicone elastomer.

In either application the other intermediate layer 20 can be either to control the surface finish or to act as an adhesion promotion or oil barrier layer. The fuser member of the present invention can be either the fuser roller, as defined above or the pressure roller also as defined above.

The outermost layer of the fuser member of the invention includes a crosslinked poly(dialkylsiloxane). The filler is a silicon T-resin which is added to the crosslinkable poly (dialkylsiloxane).

Silanol-terminated poly(dialkylsiloxane) polymers and methods of their preparation are well known. They are readily commercially available, e.g., from Huls America, Inc., (United Chemical) 80 Centennial Ave., Piscataway, N.J., U.S.A., and have the structure:

Structure (I)

For purpose of the present invention 1 is an integer such that the Structure (I) polymer has a weight average molecular weight of from 5,000 to 80,000. $R^3$ and $R^4$ are independently alkyl groups such as methyl, ethyl, propyl, butyl, pentyl, or hexyl. If the molecular weight were below 5,000, the final crosslinked poly(dialkylsiloxane) would have a high crosslink density that would make the material too hard and brittle, and not resilient enough to serve practically in a base cushion layer. If the molecular weight were above 80,000, the final crosslinked poly(dialkylsiloxane) would be too unstable under conditions of high temperature and cyclic stress (i.e., there would be too much creep and change in hardness over time).

The poly(dialkylsiloxane) polymers can be crosslinked with one or more multifunctional aryl silanes. The multifunctional aryl silanes that can serve as crosslinking agents for the Structure (I) polymers are well known for this purpose. Each of such aryl silanes comprises a silicon atom bonded to at least one group that is functional to condense with the hydroxy end groups of the Structure (I) polymers and thereby create siloxane crosslinks through the silicon atom of the silane. The crosslinking agent in general has a silane crosslinking agent containing at least one aryl group of the general formula:

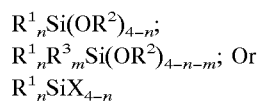

where $R^1$ is aryl and $R^2$ and $R^3$ are independently aryl or alkyl, X is a halide or hydrogen, n and m are integers such that the sum is less than or equal to 4.

At least one aryl silane must comprise a silicon atom bonded to at least three groups that are functional to condense with the hydroxy end groups of the Structure (I) polymers to thereby create siloxane crosslinks through the silicon atom of the silane Appropriate aryl silanes include diphenyldiethoxysilane, diphenyldiacetoxysilane, diphenyldichlorosilane, 2-(diphenylphosphino)ethyltriethoxysilane, triphenylmethoxysilane, diphenylsilane, phenyltriethoxysilane, diphenylmethylethoxysilane, N-phenylaminopropyltrimethoxysilane, phenethyltris (trimethoxysiloxy)silane, phenyltrichlorosilane, phenyltrimethoxysilane and diphenyltrimethoxysilane.

The condensation crosslinking reaction is generally carried out with the aid of a catalyst, such as, for example, a titanate or silicate, chloride, oxide, or carboxylic acid salt of zinc, tin, iron, or lead. Some specific examples of suitable catalysts are zinc octoate, dibutyltin diacetate, ferric chloride, and lead dioxide.

The primary crosslinkable poly(dialkylsiloxane) resin used for the Examples is Dow Corning DC3-0133, which is composed of a network-forming polymer that is a silanol-terminated (alpha, omega.-hydroxy-) poly(dimethyl siloxane) (PDMS). The number of repeat units is such that the silanol-terminated PDMS (alpha, omega-dihydroxypolydimethyl siloxane) has a weight average molecular weight of from 5,000 to 80,000. Specific examples of useful catalysts for this polymer are dibutyltin diacetate, tin octoate, zinc octoate, dibutyltin dichloride, dibutyltin dibutoxide, ferric chloride, lead dioxide, or mixtures of catalysts such as CAT50® (sold by Grace Specialty Polymers, Massachusetts). CAT50® is believed to be a mixture of dibutyltin dibutoxide and dibutyltin dichloride diluted with butanol.

The second component of the outermost layer is a silicone T-resin. A silicone T-resin as described in United Chemical catalog (page 280, $5^{th}$ edition) is a highly crosslinked material with the empirical formula (or repeat unit) $RSiO_{1.5}$ formed from polymerization of silsesquioxane monomers to form an unordered structure. R can be any alkyl or aryl group including but not limited to methyl, phenylpropyl, phenyl, or phenylvinyl. The term "unordered structure" means that the organization of repeat units is substantially random. An example structure for a such formed silicone T-resin is shown below where • represents a repeat unit.

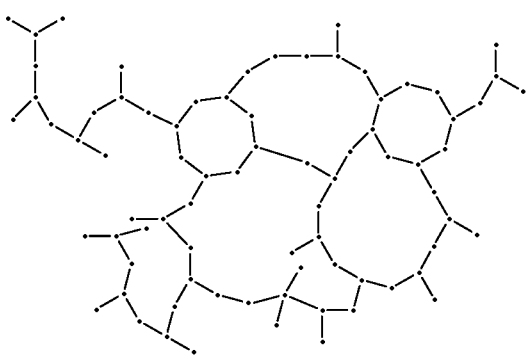

The zirconium silicate used is 1 to 5 micron particle size, obtained from Atlantic Equipment Engineers.

For the preferred embodiment, the various components of the composite material can have the following weight percentages:

(a) 10–60 wt % alpha, omega-hydroxy-poly(dialkylsiloxane)
(b) 5–50 wt % aryl silane crosslinking agent;
(c) 26–100 parts per 100 parts polymer silicone T-resin;
(d) 10–150 parts per 100 parts polymer zirconium silicate; and
(d) 0.05–2 wt % catalyst.

To form the layer of a fuser member 16 in accordance with the invention, the poly(dialkylsiloxane) resin, the silicone T-resin, the aryl silane are mixed with a 3-roll mill, propeller mixer, or similar device. The catalyst is present in an amount sufficient to solidify the composite material within a time suitable for manufacturing parts yet maintaining a sufficiently low molecular weight to facilitate processing. The catalyst is then added to the mix with thorough stirring. The mix is then degassed and injected into a mold surrounding the fuser member, e.g. roll, core to mold the material onto the core. The covered core remains in the mold for a time sufficient for some crosslinking to occur (e.g., 4 hours). The covered roll is then removed from the mold and heated to accelerate the remaining crosslinking.

It is currently preferred to apply the layer of the invention over a support which has been conversion coated and primed with metal alkoxide primer in accordance with commonly assigned U.S. Pat. No. 5,474,821.

If the material of this invention is coated over another coating layer, one or more methods of layer-to-layer adhesion improvement, such as corona discharge treatment of the other coating layer's surface, may be applied prior to application of the material of this invention. Various methods of layer-to-layer adhesion improvement are well known to one skilled in the art.

The material of this invention can be used as an outer coating layer over an oil barrier layer. An oil-barrier layer can be obtained by coating an underlying silicone elastomer, coated directly or indirectly on a cylindrical core, with a composition formed by compounding a mixture comprising a fluorocarbon copolymer, a fluorocarbon-curing agent, a curable polyftnctional poly($C_{(1-6)}$alkyl)phenylsiloxane polymer, one or more fillers and an accelerator for promoting crosslinking between the curing agent and the fluorocarbon copolymer. Other candidates for oil barrier layer include most heat resistant materials not swollen by release oils.

The roller core, usually cylindrical in shape, can be composed of any rigid metal, ceramic, or plastic substance. The material should have sufficient ductility to avoid breakage of the core during normal maintenance and operation of an electrophotographic machine. Metal cores are preferred if the roller is to be internally heated because of the high thermal conductivity of metal. Suitable core materials can include aluminum, stainless steel, metal alloys, ceramic materials, combinations of ceramic and polymeric materials, and polymeric materials such as thermoset resins with or without reinforcing additives.

The thickness of the outermost layer of the invention and any other layers present, e.g. cushion layers and the like, can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, a base cushion layer thickness in the range from 0.5 to 6.0 mm has been found to be appropriate for various applications.

The release fluid is continuously coated over the surface of the fuser member in contact with the toner image. The fuser member of the invention can be used with polydimethylsiloxane or functionalized polydimethylsiloxane release oils at normally used application rates or at reduced application rates, generally but not limited to about 0.5 mg/copy to 10 mg/copy (the copy is 8.5 by 11 inch 20 pound bond paper).

The rolls produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The following examples are presented for a further understanding of the invention.

EXAMPLE 1

100 parts DC3-0133 was blended with 100 parts GE Tospearl 145 spherical fine white powder and 100 parts zirconium silicate powder with a propeller mixer. Twenty parts of phenyltrimethoxysilane was stirred into the mixture. CAT50®. catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

COMPARATIVE EXAMPLE 1

100 Parts DC3-0133 was blended with 75 parts GE Tospearl 145 spherical fine white powder and 100 parts zinc oxide powder with a propeller mixer. 20 Parts of phenyltrimethoxysilane was stirred into the mixture. CAT50®. Catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Material Testing

Swell

Oil swell was measured by immersing a weighed sample in 350 cts Dow Coming DC200 polydimethylsiloxane for 7 days at 175° C. and calculating the weight.

Wear

The wear rate test of molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and mnning the tests at about 350° F. 480 Cycles were accumulated with a 1 kg load on a 9/16 inch wide sample. The depth of the wear track was then measured on a Federal 2000 Surfanalyzer using a chisel tip at 25 mm/min, Oil wear The wear test above was performed on a sample which had been soaked in 350 cts polydimethylsiloxane oil at 175° C. for 7 days.

Toner Release Test

The test samples are employed to evaluate the toner offset and release force characteristics of the fuser member coating. Two samples are cut approximately 1-inch square of each example. One of these squares is left untreated by release agent (the dry sample). To the surface of the other sample is applied in unmeasured amount of 350 cts polydimethysiloxane (the oil sample).

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polyester toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

| 1   | 0% offset      |
| --- | -------------- |
| 1–2 | 0–20% offset   |
| 2–3 | 20–50% offset  |
| 3–4 | 50–90% offset  |
| 4–5 | 90–100% offset |

Qualitative assessment of the force required for delamination of the paper from the sample is as follows:

| 1 | low release force      |
| - | ---------------------- |
| 2 | moderate release force |
| 3 | high release force     |

| Sample | swell (%) wt % | Wear (mils) | Oil Wear (mils) | Dry Release/ Offset | Oil release/ Offset |
| --- | --- | --- | --- | --- | --- |
| E1  | 7.0  | 3.8 | 4.7  | 1.0/1.8 | 1.0/1.4 |
| CE1 | 8.76 | 9.2 | 9.45 | 1.0/1.8 | 1.0/1.5 |

Advantages

The examples and comparative example demonstrate that incorporation of a silicone T-resin, and the zirconium silicate and an aryl silane crosslinking agent decrease the oil swell and improve the wear resistance of the materials comparing the oil swollen wear and dry wear to comparative example 1. Further it is demonstrated that toner release properties were not sacrificed.

The invention has been described with particular reference to preferred embodiments thereof but it will be understood that variations and modifications can be effected within the spirit and scope of the invention.

What is claimed is:

1. A material for coating an imaging member comprising: a cross linkable poly(dialkylsiloxane), zirconium silicate and optional Silicon T-resin.

2. The material of claim 1 wherein the poly(dialkylsiloxane) has a weight-average molecular weight before crosslinking of about 5,000 to 80,000.

3. The material according to claim 1 wherein zirconium silicate is present in an amount from 10 to 150 weight parts per 100 weight parts of cross linkable poly(dialkylsiloxane).

4. The material according to claim 1 further comprising an aryl silane crosslinking agent.

5. The material according to claim 4 wherein the aryl silane crosslinking agent has a general formula selected from $R^1{}_n Si(OR^2)_{4-n}$;

$R^1{}_n R^3{}_m Si(OR^2)_{4-n-m}$; or $R^1{}_n SiX_{4-n}$ where $R^1$ is aryl and $R^2$ and $R^3$ are independently aryl or alkyl, X is a halide or hydrogen, and n and m are integers such that their sum is less than 4 and greater than zero, and when either m is zero or m is one or more and $R^3$ is alkyl, the value of n should be at least one.

6. The material according to claim 1 wherein the cross linkable poly(dialkylsiloxane) is poly(dimethylsiloxane).

7. The material according to claim 1 wherein the cross linkable poly(dialkylsiloxane is an (alpha-omega-hydroxy-) poly(dialkylsiloxane) with the general structure

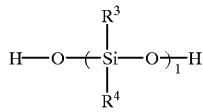

where 1 is an integer; $R^3$ and $R^4$ are independently alkyl having 1–6 carbon atoms.

8. The material according to claim 1 wherein the Silicon T-resin has the empirical formula $RSiO_{1.5}$ where R is an alkyl or aryl group.

9. The material according to claim 1 wherein the zirconium silicate has an average particle size from 1 to 5 microns.

10. The material according to claim 1 wherein the silicone T-resin is present in an amount from 26 to 100 weight parts per 100 weight parts of cross linkable poly(dialkylsiloxane).

11. The material according to claim 1 wherein the aryl silane crosslinking agent is present in an amount of 5 to 50 weight parts per 100 weight parts of cross linkable poly(dialkylsiloxane).

12. An imaging member comprising a core and an outer layer formed on an outer surface of the core, the layer comprising the material according to claim 1.

13. The imaging member according to claim 12 further comprising an oil barrier layer disposed between the core and the outer layer.

14. The imaging member according to claim 13 further including a cushion layer disposed between the oil barrier layer and the core.

15. The imaging member according to claim 12 further including a cushion layer disposed between the core and the outer layer.

16. The imaging member according to claim 12 being a fusing roller.

17. The imaging member according to claim 12 being a pressure roller.

* * * * *